(12) United States Patent
Kimba Dit Adamou et al.

(10) Patent No.: US 12,520,329 B2
(45) Date of Patent: Jan. 6, 2026

(54) SERVICE DATA TRANSMISSION METHOD AND APPARATUS, TERMINAL, AND BASE STATION

(71) Applicant: VIVO MOBILE COMMUNICATION CO., LTD., Guangdong (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 369 days.

(21) Appl. No.: 18/119,680

(22) Filed: Mar. 9, 2023

(65) Prior Publication Data

US 2023/0217464 A1 Jul. 6, 2023

Related U.S. Application Data

(63) Continuation of application No. PCT/CN2021/119043, filed on Sep. 17, 2021.

(30) Foreign Application Priority Data

Sep. 21, 2020 (CN) .......................... 202010997371.7

(51) Int. Cl.
*H04W 72/25* (2023.01)
*H04W 28/02* (2009.01)
(Continued)

(52) U.S. Cl.
CPC ....... *H04W 72/25* (2023.01); *H04W 28/0263* (2013.01); *H04W 28/0268* (2013.01);
(Continued)

(58) Field of Classification Search
CPC ............. H04W 72/25; H04W 28/0263; H04W 28/0268; H04W 80/02; H04W 84/12;
(Continued)

(56) References Cited

U.S. PATENT DOCUMENTS

2017/0111754 A1\* 4/2017 Baghel ................. H04W 76/27
2017/0285177 A1 10/2017 Jin et al.
(Continued)

FOREIGN PATENT DOCUMENTS

CN 107295669 A 10/2017
CN 108307472 A 7/2018
(Continued)

OTHER PUBLICATIONS

Huawei et al., "Corrections on V2X functionalities in TS 36.331," 3GPP TSG-RAN WG2 Meeting #110 electronic, R2-2006430, pp. 1-61, (Jun. 12, 2020).
(Continued)

*Primary Examiner* — Afshawn M Towfighi
(74) *Attorney, Agent, or Firm* — Price Heneveld LLP

(57) ABSTRACT

This application discloses a service data transmission method and apparatus, a terminal, and a base station. The service data transmission method includes: performing sending and/or receiving of service data according to SL and WLAN interworking configuration information.

20 Claims, 8 Drawing Sheets

(51) Int. Cl.
*H04W 80/02* (2009.01)
*H04W 84/12* (2009.01)
*H04W 88/04* (2009.01)

(52) U.S. Cl.
CPC ............ *H04W 80/02* (2013.01); *H04W 84/12* (2013.01); *H04W 88/04* (2013.01)

(58) Field of Classification Search
CPC ..... H04W 88/04; H04W 92/18; H04W 40/22; H04W 76/14; H04W 76/16; H04W 48/08; H04W 88/06; H04W 92/02
See application file for complete search history.

(56) References Cited

U.S. PATENT DOCUMENTS

2017/0289873 A1* 10/2017 Kim ................ H04W 36/00698
2019/0124651 A1    4/2019 Xu et al.
2020/0029353 A1    1/2020 Xu et al.
2022/0369164 A1* 11/2022 Hu ........................ H04W 40/22

FOREIGN PATENT DOCUMENTS

| CN | 108781452 A | 11/2018 | |
|---|---|---|---|
| WO | 2018028694 A1 | 2/2018 | |
| WO | 2020168080 A1 | 8/2020 | |
| WO | WO-2021138155 A1 * | 7/2021 | ............ H04W 8/005 |

OTHER PUBLICATIONS

International Search Report and Written Opinion of the International Searching Authority dated Dec. 1, 2021 as received in Application No. PCT/CN2021/119043.

* cited by examiner

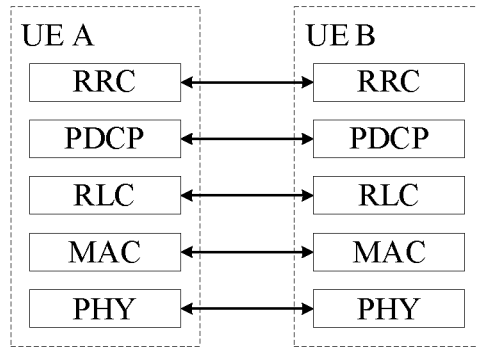
FIG. 3
Perform sending and/or receiving of service data according to SL and WLAN interworking configuration information —— 41
FIG. 4
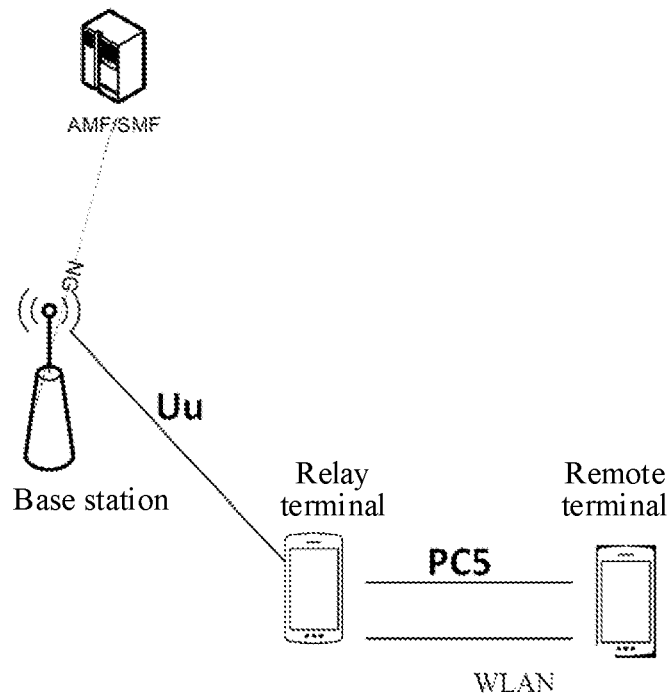
FIG. 5

SERVICE DATA TRANSMISSION METHOD AND APPARATUS, TERMINAL, AND BASE STATION

CROSS-REFERENCE TO RELATED APPLICATIONS

This application is a continuation application of PCT International Application No. PCT/CN2021/119043 filed on Sep. 17, 2021, which claims the priority of Chinese Patent Application No. 202010997371.7 filed in China on Sep. 21, 2020. All the disclosures are incorporated herein by reference in their entireties.

TECHNICAL FIELD

This application relates to the field of wireless communication technologies, and specifically, to a service data transmission method and apparatus, a terminal, and a base station.

BACKGROUND

In the related art, a Uu interface between a network side device and a terminal user equipment (UE, also referred to as a terminal) can support interworking with a wireless local area network (WLAN), but a sidelink (SL) interface does not support the interworking with the WLAN.

Because a WLAN interface uses an unlicensed spectrum and shares a bandwidth, fees are low or no fees exist. In addition, a UE with a WLAN interface has standard configuration, and no additional hardware costs. If an SL interface between UEs supports the interworking with the WLAN, a transmission rate between the UEs can be greatly improved, and path configuration of different services can be performed according to service features, thereby improving user experience on the basis of ensuring QoS.

However, SL and WLAN interworking is not supported currently.

SUMMARY

According to a first aspect, a service data transmission method is provided, and applied to a terminal. The method includes:
  performing sending and/or receiving of service data according to SL and wireless local area network WLAN interworking configuration information.

According to a second aspect, a service data transmission method is provided, and applied to a base station. The method includes:
  performing sending and/or receiving of service data according to SL and wireless local area network WLAN interworking configuration information.

According to a third aspect, a service data transmission apparatus is provided, including:
  a transmission module, configured to perform sending and/or receiving of service data according to SL and WLAN interworking configuration information.

According to a fourth aspect, a communication device is provided, including a processor, a memory, and a program or an instruction stored in the memory and capable of being run on the processor, and the program or the instruction, when executed by the processor, implements the steps of the method according to the first aspect; or the program or the instruction, when executed by the processor, implements the steps of the method according to the second aspect.

According to a fifth aspect, a readable storage medium is provided, where the readable storage medium stores a program or an instruction, and the program or the instruction, when executed by a processor, implements the steps of the method according to the first aspect; or the program or the instruction, when executed by the processor, implements the steps of the method according to the second aspect.

According to a sixth aspect, a chip is provided, where the chip includes a processor and a communication interface, the communication interface is coupled with the processor, and the processor is configured to run a program or an instruction of a network side device to implement the method according to the first aspect; or to implements the method according to the second aspect.

According to a seventh aspect, a program product is provided, where the program product is stored in a non-volatile storage medium, and the program product is executed by at least one processor to implement the method according to the first aspect; or the program product is executed by at least one processor to implement the method according to the second aspect.

BRIEF DESCRIPTION OF THE DRAWINGS

FIG. 3 is a schematic diagram of a control plane protocol stack of a sidelink interface in the related art;

FIG. 4 is a schematic flowchart of a service data transmission method according to an embodiment of this application;

FIG. 5 is a schematic architecture diagram of a control plane of an SL and WLAN interworking scenario involved in an embodiment of this application;

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a particular order or sequence. It should be understood that the data so used may be interchanged in an appropriate condition, so that the embodiments of this application can be implemented in a sequence other than those illustrated or described herein. In addition, objects distinguished by "first" and "second" are usually a same type, and a quantity of the objects is not limited, for example, a first object may be one or may be a plurality. In addition, "and/or" in this specification and the claims indicates at least one of the connected objects. A character "/" usually indicates an "or" relationship between the associated objects.

It should be noted that, the technologies described in the embodiments of this application are not limited to a long term evolution (LTE)/LTE-advanced (LTE-A) system, and may be further applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a new radio (NR) system for an exemplary objective, and uses NR terms in most of the following description, though such technologies may also be applied to applications except an NR system application, such as a 6th generation (6G) communication system.

Figure 1:
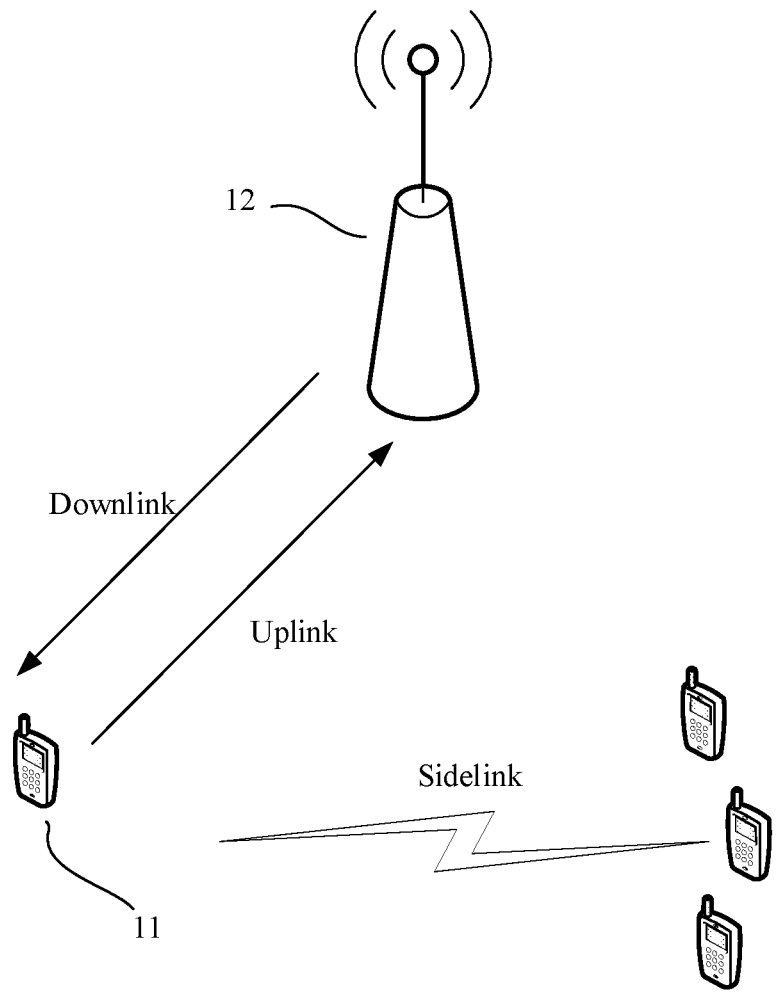
FIG. 1 is a block diagram of a wireless communication system to which embodiments of this application may be applied.

FIG. 1 shows a block diagram of a wireless communication system that may be applied to an embodiment of this application. The wireless communication system includes a terminal 11 and a network device 12. The terminal 11 may also be referred to as a terminal device or a user equipment (UE). The terminal 11 may be a mobile phone, a tablet personal computer, a laptop computer referred to as a notebook computer, a personal digital assistant (PDA), a palm personal computer, a netbook, an ultra-mobile personal computer (UMPC), a mobile Internet device (MID), a wearable device or a vehicle user equipment (VUE), a pedestrian user equipment (PUE), or other terminal side devices. The wearable device includes: a smart watch, an earphone, glasses, and the like. It should be noted that, a specific type of the terminal 11 is not limited in the embodiments of this application. The network side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

Communication terms related to this application are first described below.

1. Introduction of Sidelink

Long term evolution (LTE) systems start supporting a sidelink from the 12th release version, for direct data transmission between a terminal user equipment (UE, also referred to as a terminal) without using a network side device.

A design of an LTE sidelink is applicable to specific public security affairs (such as emergency communication in a disaster site of fire or an earthquake), vehicle-to-everything (V2X) communication, or the like. The vehicle-to-everything communication includes various services, such as, basic security communication, advanced (automatic) driving, formation, and sensor expansion. Because the LTE sidelink supports only broadcast communication, the LTE sidelink is mainly applied to the basic security communication, and other advanced V2X services with strict quality of service (QoS) requirements in terms of latency and reliability are supported through a new radio (NR) sidelink.

A 5G NR system may be applied to a working band higher than 6 GHz that is not supported by LTE, and supports a larger working bandwidth. However, an NR system of a current version supports only an interface between a base station and a terminal, and does not support a sidelink interface for direct communication between terminals. A sidelink link interface may also be referred to as a PC5 interface.

2. Transmission Forms of Sidelink

Currently, sidelink communication is mainly classified into several transmission forms: broadcast, groupcast, and unicast. As the name suggests, the unicast is one-to-one (one to one) transmission. The groupcast is one-to-many (one to many) transmission. The broadcast is also the one-to-many transmission, but the broadcast has no concept that UEs belong to the same group.

Currently, Sidelink unicast and groupcast communication supports a feedback mechanism of a physical layer hybrid automatic repeat request (HARQ).

3. Resource Allocation Modes: Mode 1 and Mode 2

The resource allocation modes of Sidelink UEs are classified into two types:
1) Base station scheduling mode (Mode 1): A base station controls and allocates resources for each UE.
2) UE autonomous mode (Mode 2): Each UE autonomously select resources.

4. SL Protocol Stack

Figure 2:
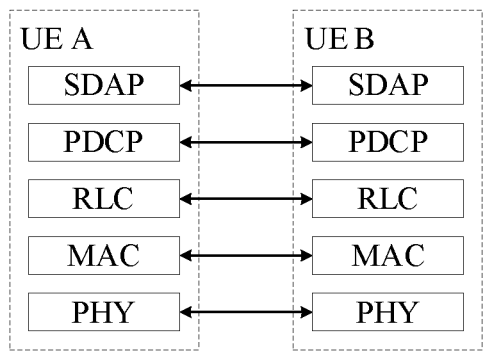
FIG. 2 is a schematic diagram of a user plane protocol stack of a sidelink interface in the related art.

For a conventional SL (sidelink) interface, as shown in FIG. 2, a user plane (UP) protocol stack between two UEs, from a bottom layer to a high layer, includes: a physical layer (PHY), Media Access Control (MAC), radio link control (Radio Link Control, RLC), a packet data convergence protocol (PDCP), and a service data adaption protocol (SDAP). As shown in FIG. 3, a control plane (CP) protocol stack, from a bottom layer to a high layer, includes: a PHY, MAC, RLC, a PDCP, and radio resource control (RRC) (PC5-S).

Currently, the SL does not support interworking with a WLAN, and therefore there is no related protocol stack or/and interface between a WLAN node and an SL node.

The following describes a service data transmission method, a terminal, and a communication device provided in the embodiments of this application in detail with reference to the accompanying drawings through specific embodiments and application scenarios thereof.

FIG. 4 is a schematic flowchart of a service data transmission method according to an embodiment of this application. The method is applied to a communication device. In this embodiment of this application, the communication device may be a terminal, or a base station. The method includes:

Step 41: performing sending and/or receiving of service data according to SL and wireless local area network WLAN interworking configuration information.

In this embodiment of this application, according to the SL and WLAN interworking configuration information, a relay terminal and a remote terminal in a sidelink can better use an unlicensed spectrum WLAN to perform a transmission operation of interworking with the SL, thereby improving a service rate of a user, ensuring quality of service (QoS) of a UE service, and ensuring system efficiency and utilization of a network spectrum while improving user experience.

In this embodiment of this application, optionally, the SL and WLAN interworking configuration information includes at least one of SL and WLAN interworking configuration information configured by a base station or SL and WLAN interworking configuration information configured by a relay terminal.

In this embodiment of this application, optionally, the SL and WLAN interworking configuration information configured by the base station includes at least one of the following:
  supporting SL and WLAN interworking;
  a service feature for performing WLAN transmission;
  service QoS stream information for performing the WLAN transmission;
  service data radio bearer (DRB) information for performing the WLAN transmission;
  configuration of a protocol stack layer corresponding to a service for performing the WLAN transmission; a protocol stack layer, such as PDCP and/or SDPA;
  a service feature for performing WLAN split transmission or duplication transmission;
  service QoS stream information for performing the WLAN split transmission or duplication transmission;
  service DRB information for performing the WLAN split transmission or duplication transmission;
  configuration of a protocol stack layer corresponding to a service for performing the WLAN split transmission or duplication transmission; a protocol stack layer, such as PDCP and/or SDPA;
  a service feature for performing SL transmission;
  service QoS stream information for performing the SL transmission;
  service DRB information for performing the SL transmission;
  configuration of a protocol stack layer corresponding to a service for performing the SL transmission; or
  interface or port information of WLAN transmission data.

In this embodiment of this application, optionally, the SL and WLAN interworking configuration information configured by the relay terminal includes at least one of the following:
  configuration information of a WLAN DRB;
  configuration information of a QoS stream mapped to the WLAN DRB;
  configuration information of a WLAN split DRB or duplication DRB;
  configuration information of a QoS stream mapped to a WLAN split DRB;
  configuration information of a WLAN interface or port;
  configuration information of an SL DRB;
  configuration information of a QoS stream mapped to the SL DRB; or
  WLAN MAC address information involved in SL and WLAN interworking.

In some embodiments of this application, optionally, the communication device is the relay terminal, and before the performing sending and/or receiving of service data according to SL and WLAN interworking configuration information, the method further includes at least one of the following:
  sending the SL and WLAN interworking configuration information to a remote terminal; and
  receiving the SL and WLAN interworking configuration information sent by the base station and forwarding the information to the remote terminal.

In some embodiments of this application, optionally, the communication device is the remote terminal, and before the performing sending and/or receiving of service data according to SL and WLAN interworking configuration information, the method further includes:
  receiving the SL and WLAN interworking configuration information sent by the base station and/or the relay terminal.

In some embodiments of this application, optionally, the communication device is the base station, and before the performing sending and/or receiving of service data according to SL and WLAN interworking configuration information, the method further includes:
  sending the SL and WLAN interworking configuration information to a relay terminal and/or a remote terminal.

In this embodiment of this application, optionally, the base station may send the SL and WLAN interworking configuration information to the relay terminal and/or the remote terminal through radio resource control (RRC) dedicated signaling. Alternatively, the base station may send the SL and WLAN interworking configuration information to the relay terminal through the RRC dedicated signaling, and the relay terminal forwards the information to the remote terminal. Alternatively, the base station may send the SL and WLAN interworking configuration information to the relay terminal and the remote terminal in a broadcast manner (such as a system information block (SIB) message).

Optionally, the performing sending and/or receiving of service data according to SL and WLAN interworking configuration information includes one of the following:
  completing the sending and/or receiving of service data completely through an SL bearer;
  completing the sending and/or receiving of service data through an SL and WLAN split bearer; and
  completing the sending and/or receiving of service data completely through a WLAN bearer.

In this embodiment of this application, optionally, the foregoing three bearing manners may include a service data bearing, or include signaling bearing.

FIG. 5 is a schematic architecture diagram of a control plane of an SL and WLAN interworking scenario involved in an embodiment of this application. Under this architecture, a relay terminal in a sidelink is connected to a base station through a Uu interface, the relay terminal serves as an SL node and a WLAN node simultaneously, and the relay terminal and a remote terminal are connected through a PC5 interface and a WLAN interface, that is, the SL node and the WLAN node are co-sited.

Figure 6:
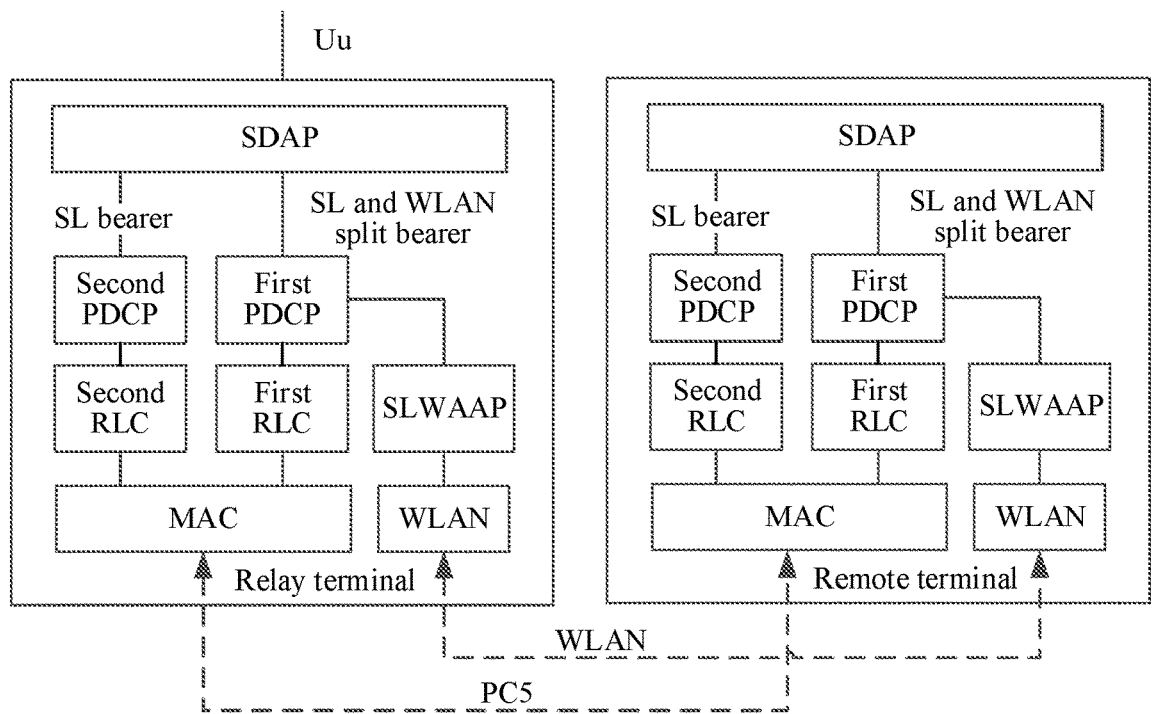
FIG. 6 is a schematic structural diagram of a user plane protocol stack of the SL and WLAN interworking scenario involved in FIG. 5.

FIG. 6 is a schematic structural diagram of a user plane protocol stack of the SL and WLAN interworking scenario involved in FIG. 5;

The SL and WLAN interworking means that, in an existing SL architecture, some data streams need to be split to the WLAN for transmission, and unified management and control. Bearers of the foregoing three types are respectively:

an SL bearer: a bearer for performing transmission completely through a PC5 interface and resource;

an SL and WLAN split bearer: a bearer for performing transmission through the PC5 interface and resource and the WLAN interface and resource; and a WLAN bearer: a bearer for performing transmission completely through the WLAN interface and resource.

In this embodiment of this application, optionally, the foregoing three bearing manners may include a service data bearing, or include signaling bearing.

It may be learned from FIG. 6 that the relay terminal and the remote terminal both include: a first protocol stack, where the first protocol stack is used for bearing the PC5 interface and the WLAN interface between the relay terminal and the remote terminal, and the first protocol stack includes a first PDCP entity, a first RLC entity logically connected to the first PDCP entity, an MAC entity logically connected to the first RLC entity, a PHY entity logically connected to the MAC entity, an adaptive entity (SLWAAP) logically connected to the first PDCP entity, a WLAN entity logically connected to the adaptive entity, and a PHY entity logically connected to the WLAN entity. In a service data transmission process, reordering and duplication operations are performed by the first PDCP entity.

The foregoing completing the sending and/or receiving of service data through an SL and WLAN split bearer includes: sending and/or receiving service data through the first protocol stack.

In this embodiment of this application, optionally, the relay terminal and the remote terminal further include: a fourth protocol stack, where the fourth protocol stack is used for bearing the PC5 interface between the relay terminal and the remote terminal, and the fourth protocol stack includes: a second PDCP entity, a second RLC entity logically connected to the second PDCP entity, an MAC entity logically connected to the second RLC entity, and a PHY entity logically connected to the MAC entity. In this embodiment of this application, the first protocol stack and the fourth protocol stack share one MAC entity.

The foregoing completing the sending and/or receiving of service data completely through an SL bearer includes: performing the sending and/or receiving of service data through the fourth protocol stack.

In this embodiment of this application, optionally, the relay terminal and the remote terminal may further include: a fifth protocol stack, where the fifth protocol stack is used for bearing the WLAN interface between the relay terminal and the remote terminal, and the fifth protocol stack includes: a WLAN entity and a PHY entity logically connected to the WLAN entity.

The foregoing completing the sending and/or receiving of service data completely through a WLAN bearer includes: performing the sending and/or receiving of service data through the fifth protocol stack.

Figure 7:
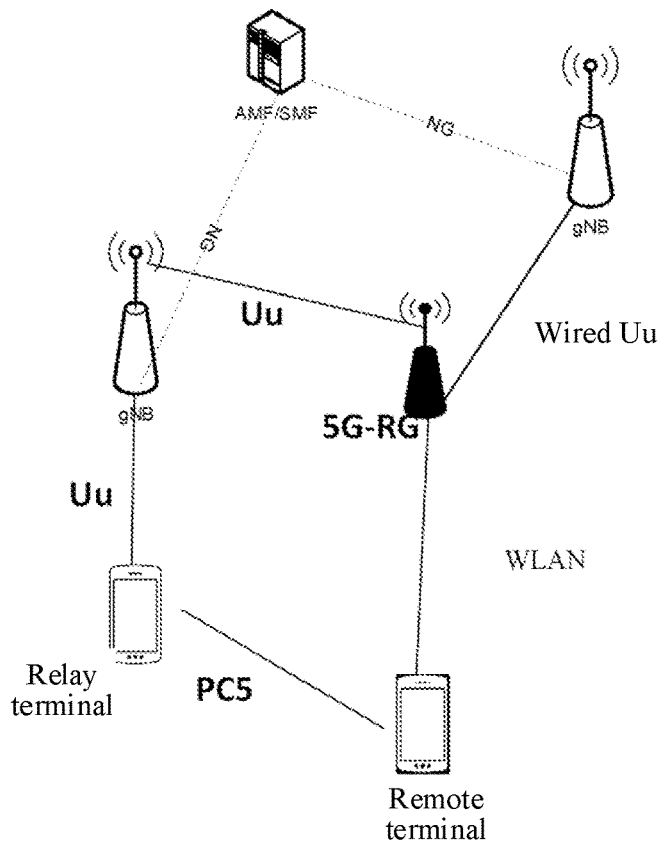
FIG. 7 is a schematic architecture diagram of a control plane of an SL and WLAN interworking scenario involved in another embodiment of this application.

FIG. 7 is a schematic architecture diagram of a control plane of an SL and WLAN interworking scenario involved in another embodiment of this application. Under this architecture, a relay terminal serves as an SL node and is arranged separately from a WLAN node, that is, the SL node and the WLAN node are not co-sited. The WLAN node may be, for example, a 5G-RG (5G residential gateway). The relay terminal and the WLAN node may be connected to a base station (gNB) through a Uu interface. The relay terminal is connected to a remote terminal through a PC5 interface, and the WLAN node is connected to the remote terminal through a WLAN interface. The WLAN may adopt, for example, a Wi-Fi connection manner.

Figure 8:
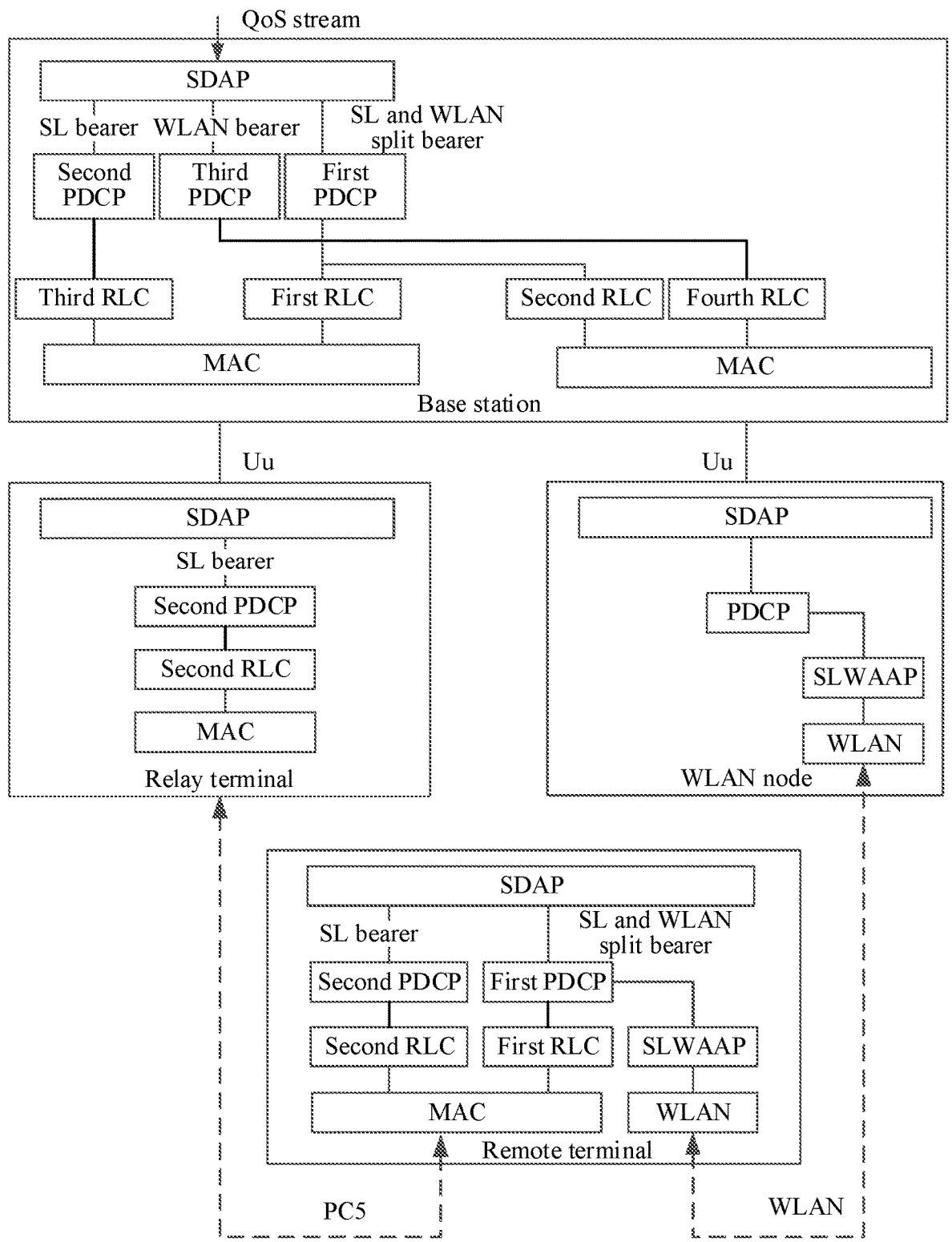
FIG. 8 is a schematic structural diagram of a user plane protocol stack of the SL and WLAN interworking scenario involved in FIG. 7.

FIG. 8 is a schematic structural diagram of a user plane protocol stack of the SL and WLAN interworking scenario involved in FIG. 7.

A Uu-PC5 and a Uu-WLAN interworks, data streams are split from the base station, stream 1 through the Uu-PC5, and stream 2 through the Uu-WLAN.

The Uu-SL and the Uu-WLAN interworking means that, in an existing Uu-SL architecture, some data streams need to be split to the Uu-WLAN for transmission, and unified management and control. Bearers of the foregoing three types are respectively:

an SL bearer: a bearer for performing transmission completely through a Uu-PC5 interface and resource;

an SL and WLAN split bearer: a bearer for performing transmission through both the Uu PC5 interface and resource and a Uu-WLAN interface and resource; and a WLAN bearer: a bearer for performing transmission completely through the Uu-WLAN interface and resource.

In this embodiment of this application, optionally, the foregoing three bearing manners may include a service data bearing, or include signaling bearing.

It may be learned from FIG. 8 that:

the base station includes a second protocol stack, where the second protocol stack includes a first PDCP entity (such as an NR PDCP), a first RLC entity logically connected to the first PDCP entity (such as a main network node (MN) RLC entity), an MAC entity logically connected to the first RLC entity, a PHY entity logically connected to the MAC entity, a second RLC entity logically connected to the first PDCP entity (such as a secondary network node (SN) RLC entity), an MAC entity logically connected to the second RLC entity, and a PHY entity logically connected to the MAC entity.

The foregoing completing the sending and/or receiving of service data through an SL and WLAN split bearer includes: performing the sending and/or receiving of service data with a remote terminal through the second protocol stack.

Optionally, the base station further includes a sixth protocol stack, where the sixth protocol stack includes a second PDCP entity (such as an NR PDCP), a third RLC entity logically connected to the second PDCP entity (such as an MN RLC entity), an MAC entity logically connected to the third RLC entity, and a PHY entity logically connected to the MAC entity.

The foregoing completing the sending and/or receiving of service data completely through an SL bearer includes: performing the sending and/or receiving of service data with the remote terminal through the sixth protocol stack.

Optionally, the base station further includes a seventh protocol stack, where the seventh protocol stack includes a third PDCP entity (such as an NR PDCP), a fourth RLC entity logically connected to the third PDCP entity (such as an SN RLC entity), an MAC entity logically connected to the fourth RLC entity, and a PHY entity logically connected to the MAC entity.

The foregoing completing the sending and/or receiving of service data completely through a WLAN bearer includes: performing the sending and/or receiving of service data with the remote terminal through the seventh protocol stack.

In this embodiment of this application, optionally, the remote terminal includes: a first protocol stack, where the first protocol stack includes a first PDCP entity, a first RLC entity logically connected to the first PDCP entity, an MAC entity logically connected to the first RLC entity, a PHY entity logically connected to the MAC entity, an adaptive entity (SLWAAP) logically connected to the first PDCP entity, a WLAN entity logically connected to the adaptive entity, and a PHY entity logically connected to the WLAN entity.

The foregoing completing the sending and/or receiving of service data through an SL and WLAN split bearer includes: the remote terminal performs the sending and/or receiving of service data through the first protocol stack.

Optionally, the remote terminal further includes: a fourth protocol stack, where the fourth protocol stack includes: a second PDCP entity, a second RLC entity logically connected to the second PDCP entity, an MAC entity logically connected to the second RLC entity, and a PHY entity logically connected to the MAC entity. In this embodiment of this application, the first protocol stack and the fourth protocol stack in the remote terminal share one MAC entity.

The foregoing completing the sending and/or receiving of service data completely through an SL bearer includes: the remote terminal performs the sending and/or receiving of service data through the fourth protocol stack.

Optionally, the remote terminal further includes: a fifth protocol stack, where the fifth protocol stack includes: a WLAN entity and a PHY entity logically connected to the WLAN entity.

The foregoing completing the sending and/or receiving of service data completely through a WLAN bearer includes: the remote terminal performs the sending and/or receiving of service data through the fifth protocol stack.

In this embodiment of this application, optionally, the relay terminal includes a fourth protocol stack, where the fourth protocol stack includes a second PDCP entity, a second RLC entity logically connected to the second PDCP entity, an MAC entity logically connected to the second RLC entity, and a PHY entity logically connected to the MAC entity.

The foregoing completing the sending and/or receiving of service data completely through an SL bearer includes: the relay terminal performs the sending and/or receiving of service data through the fourth protocol stack.

In this embodiment of this application, optionally, the WLAN node includes an eighth protocol stack, where the eighth protocol stack includes a PDCP entity, an adaptive entity (SLWAAP) logically connected to the PDCP entity, a WLAN entity logically connected to the adaptive entity, and a PHY entity logically connected to the WLAN entity.

The foregoing completing the sending and/or receiving of service data through an SL and WLAN split bearer includes: the WLAN node performs the sending and/or receiving of service data through the eighth protocol stack.

Optionally, the WLAN node further includes: a ninth protocol stack, where the ninth protocol stack includes a WLAN entity and a PHY entity logically connected to the WLAN entity.

The foregoing completing the sending and/or receiving of service data completely through a WLAN bearer includes: the WLAN node performs the sending and/or receiving of service data through the fifth protocol stack.

Figure 9:
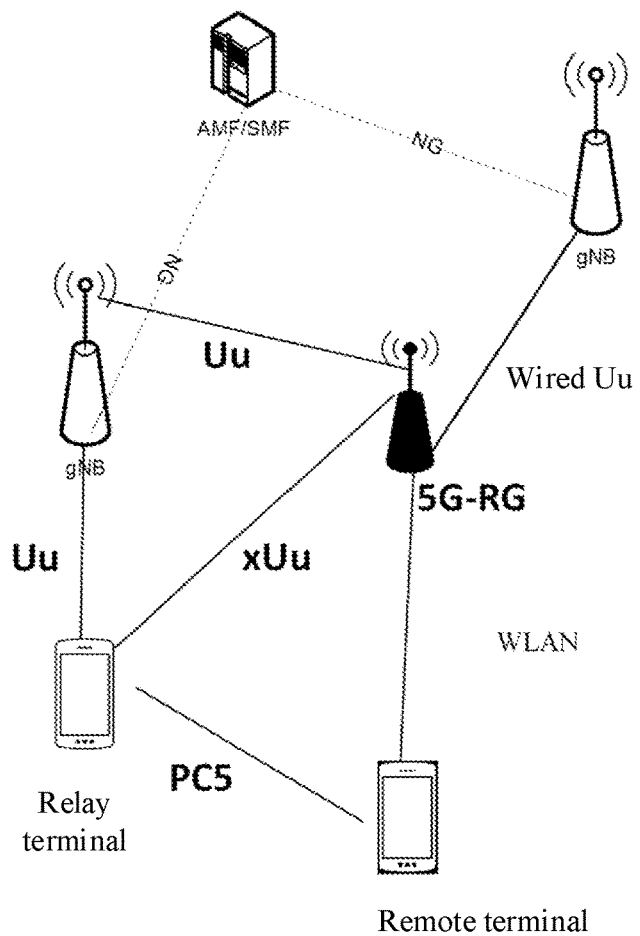
FIG. 9 is a schematic architecture diagram of a control plane of an SL and WLAN interworking scenario involved in still another embodiment of this application.

FIG. 9 is a schematic architecture diagram of a control plane of an SL and WLAN interworking scenario involved in still another embodiment of this application. Under this architecture, a relay terminal serves as an SL node and is arranged separately from a WLAN node, that is, the SL node and the WLAN node are not co-sited. The WLAN node may be, for example, a 5G-RG (5G residential gateway). The relay terminal is connected to a remote terminal through a PC5 interface, and the WLAN node is connected to the remote terminal through a WLAN interface. The WLAN may adopt, for example, a Wi-Fi connection manner. The relay terminal and the WLAN node may interact in the following manners: a Uu interface, a PC5 interface, or an xUu interface.

Figure 10:
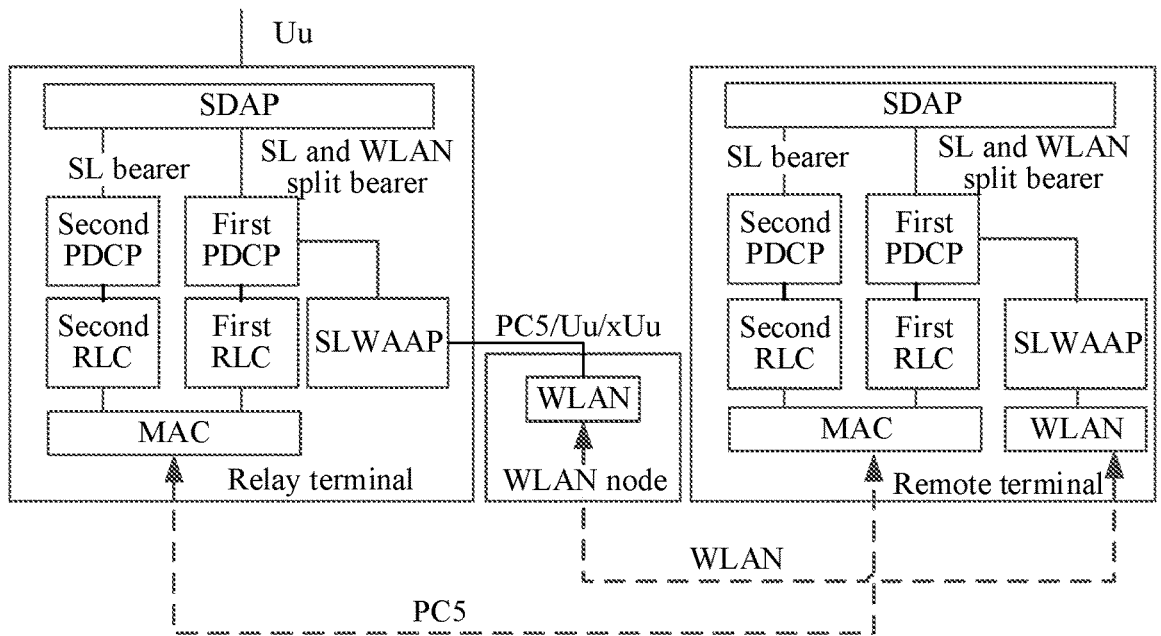
FIG. 10 is a schematic structural diagram of a user plane protocol stack of the SL and WLAN interworking scenario involved in FIG. 9.

FIG. 10 is a schematic structural diagram of a user plane protocol stack of the SL and WLAN interworking scenario involved in FIG. 9.

The SL and WLAN interworking means that, in an existing SL architecture, some data streams need to be split to the WLAN for transmission, and unified management and control. Bearers of the foregoing three types are respectively:

an SL bearer: a bearer for performing transmission completely through a PC5 interface and resource;

an SL and WLAN split bearer: a bearer for performing transmission through the PC5 interface and resource and the WLAN interface and resource; and a WLAN bearer: a bearer for performing transmission completely through the WLAN interface and resource.

In this embodiment of this application, optionally, the foregoing three bearing manners may include a service data bearing, or include signaling bearing.

It may be learned from FIG. 10 that:

Optionally, the remote terminal includes: a first protocol stack, where the first protocol stack is used for bearing the PC5 interface and the WLAN interface between the relay terminal and the remote terminal, and the first protocol stack includes a first PDCP entity, a first RLC entity logically connected to the first PDCP entity, an MAC entity logically connected to the first RLC entity, a PHY entity logically connected to the MAC entity, an adaptive entity (SLWAAP) logically connected to the first PDCP entity, a WLAN entity logically connected to the adaptive entity, and a PHY entity logically connected to the WLAN entity. In a service data transmission process, reordering and duplication operations are performed by the first PDCP entity.

The foregoing completing the sending and/or receiving of service data through an SL and WLAN split bearer includes: the remote terminal performs the sending and/or receiving of service data through the first protocol stack.

In this embodiment of this application, optionally, the remote terminal further includes: a fourth protocol stack, where the fourth protocol stack is used for bearing the PC5 interface between the relay terminal and the remote terminal, and the fourth protocol stack includes: a second PDCP entity, a second RLC entity logically connected to the second PDCP entity, an MAC entity logically connected to the second RLC entity, and a PHY entity logically connected to the MAC entity. In this embodiment of this application, the first protocol stack and the fourth protocol stack share one MAC entity.

The foregoing completing the sending and/or receiving of service data completely through an SL bearer includes: the remote terminal performs the sending and/or receiving of service data through the fourth protocol stack.

In this embodiment of this application, optionally, the remote terminal may further include: a fifth protocol stack, where the fifth protocol stack is used for bearing the WLAN interface between the relay terminal and the remote terminal, and the fifth protocol stack includes: a WLAN entity and a PHY entity logically connected to the WLAN entity.

The foregoing completing the sending and/or receiving of service data completely through a WLAN bearer includes: the remote terminal performs the sending and/or receiving of service data through the fifth protocol stack.

In this embodiment of this application, optionally, the relay terminal includes: a third protocol stack, where the third protocol stack is used for bearing the PC5 interface and the WLAN interface between the relay terminal and the remote terminal, and the third protocol stack includes a first PDCP entity, a first RLC entity logically connected to the first PDCP entity, an MAC entity logically connected to the first RLC entity, a PHY entity logically connected to the MAC entity, and an adaptive entity (SLWAAP) logically connected to the first PDCP entity.

The WLAN node includes a tenth protocol stack, where the tenth protocol stack is used for bearing the WLAN interface between the WLAN node and the remote terminal in the SL and WLAN split bearer, and the tenth protocol stack includes a WLAN entity logically connected to the adaptive entity in the relay terminal and a PHY entity logically connected to the WLAN entity.

Optionally, the relay terminal further includes a fourth protocol stack, where the fourth protocol stack is used for bearing the PC5 interface between the relay terminal and the remote terminal, and the fourth protocol stack includes a second PDCP entity, a second RLC entity logically connected to the second PDCP entity, an MAC entity logically connected to the second RLC entity, and a PHY entity logically connected to the MAC entity. In this embodiment of this application, the first protocol stack and the fourth protocol stack may share one MAC entity.

In this embodiment of this application, optionally, if the communication device is the remote terminal, the foregoing service data transmission method further includes: receiving WLAN measurement configuration information sent by the base station and/or the relay terminal.

In this embodiment of this application, optionally, if the communication device is the relay terminal, the foregoing service data transmission method further includes:
sending WLAN measurement configuration information to the relay terminal; or
receiving the WLAN measurement configuration information sent by the base station and forwarding the information to the remote terminal.

In this embodiment of this application, optionally, if the communication device is the base station, the foregoing service data transmission method further includes:
sending WLAN measurement configuration information to the remote terminal; or
sending the WLAN measurement configuration information to the remote terminal through the relay terminal.

Optionally, the WLAN measurement configuration information includes at least one of the following:
WLAN measurement configuration parameters; or
WLAN measurement report parameters.

Optionally, the WLAN measurement configuration parameters include at least
1) a WLAN band indicator list (bandIndicatorListWLAN): including a WLAN band list. A value of band2dot4 indicates a band of 2.4 GHz, a value of band5 indicates a band of 5 GHz, and a value of band60 indicates a band of 60 GHz.
2) a WLAN carrier information list (carrierInfoListWLAN): including a measured object;
3) a WLAN identifier list needing to be added into measurement configuration (wlan-ToAddModList);
4) a WLAN identifier list needing to be removed from the measurement configuration (wlan-ToRemoveList);
5) whether a measurement report includes WLAN available admission capacity (availableAdmissionCapacityRequestWLAN); and a value of true indicates that the WLAN available admission capacity (if available) needs to be included in the measurement report by a UE;
6) whether the measurement report includes a WLAN backhaul uplink and/or downlink bandwidth; backhaulUL-BandwidthRequestWLAN and backhaulDL-BandwidthRequestWLAN; and a value of true indicates that the WLAN backhaul uplink and/or downlink bandwidth (if available) needs to be included in the measurement report by the UE;
7) whether the measurement report includes a WLAN band (bandRequestWLAN); and a value of true indicates that the WLAN band needs to be included in the measurement report by the UE;
8) whether the measurement report includes WLAN carrier information (carrierInfoRequestWLAN); and a value of true indicates that the WLAN carrier information (if available) needs to be included in the measurement report by the UE;
9) whether the measurement report includes WLAN channel utilization (channelUtilizationRequest-WLAN); and a value of true indicates that the WLAN channel utilization (if available) needs to be included in the measurement report by the UE;
10) an event ID (eventId) for triggering WLAN measurement; a maximum of cells (excluding serving cells) needs to be included in the measurement report. If an objective is ReportStrongTestCellsForSON, only a value 1 is set to be available. For an RAT-crossed WLAN, it is a maximum of WLANs that needs to be included in the measurement report;
11) the maximum of cells in the measurement report (maxReportCells);
12) WLAN received signal strength indication (received signal strength indication, RSSI) measurement report configuration (measRSSI-ReportConfigNR); if the field exists, the UE needs to execute the RSSI (Received Signal Strength Indication, received signal strength indication) and a measurement report of channel occupancy;
13) reporting any WLAN access point meeting an interworking trigger request (reportAnyWLAN); indicating that the UE reports any WLAN access point meeting a trigger request;
14) WLAN carrier information (WLAN-CarrierInfo);
15) a WLAN channel quantity (channelNumbers);
16) WLAN country or area code (countryCode);

17) a WLAN operating class (operatingClass);
18) a WLAN-name (WLAN-Name); if configured with the WLAN-name, the UE performs the WLAN measurement only according to an identified name. For each name, it refers to a service set identifier (SSID) defined in a protocol; and
19) events for triggering the WLAN measurement;

For Example:
Event W1: the WLAN becomes better than a threshold;
Event W2: all WLANs in a WLAN mobile set become worse than a threshold 1, and WLANs outside the WLAN mobile set become better than a threshold 2; and
Event W3: the all WLANs in the WLAN mobile set become worse than a threshold.

Optionally, the WLAN measurement report parameters include at least one of the following:
1) the WLAN available admission capacity (availableAdmissionCapacityWLAN);
2) the WLAN backhaul downlink bandwidth (backhaulDL-BandwidthWLAN); a WLAN backhaul available downlink bandwidth is equal to a downlink speed multiplied by a downlink load defined by a Wi-Fi alliance hotspot 2.0;
3) the WLAN backhaul uplink bandwidth (backhaulUL-BandwidthWLAN); a WLAN backhaul available uplink bandwidth is equal to an uplink speed multiplied by an uplink load defined by the Wi-Fi alliance hotspot 2.0;
4) the WLAN carrier information (carrierInfoWLAN);
5) WLAN channel occupancy information (channelOccupancy); indicating a sample percentage in a case that the RSSI is higher than a configured ChannelOccupmentNCythreshold;
6) the WLAN channel utilization (channelUtilizationWLAN);
7) indication information used for indicating whether the remote terminal is connected to a WLAN to which a measurement result is applicable (connectedWLAN);
8) a WLAN measurement result list (measResultListWLAN); a measurement result list of a maximum of best WLANs reported by those excluding a WLAN mobile set that is measured and identified by the WLAN and a connected WLAN (if exists);
9) a WLAN RSSI measurement result (rssiWLAN); a WLAN RSSI result is measured in a unit of dBm;
10) a count of stations associated with the WLAN (stationCountWLAN); indicating a count of stations currently associated with the WLAN that is defined by a protocol;
11) WLAN identifiers (wlan-Identifiers); indicating WLAN parameters used for identifying the WLAN to which the measurement result is applicable; and
12) WLAN round-trip event RTT information.

Optionally, the WLAN round-trip event RTT information includes at least one of the following:
rttValue: this field assigns a measurement value of a round-trip time (RTT) between a target device and a WLAN access point, and a unit is assigned by a field rttUnits;
rttUnits: this field assigns units of fields rttValue and rttAccuracy, where available units include 1000 ns, 100 ns, 10 ns, 1 ns, and 0.1 ns; and
rttAccuracy: this field provides estimated accuracy of the provided rttValue that is represented in a unit assigned by the field rttUnits.

In the foregoing embodiments of this application, a 5G system is used as an example, but the foregoing service data transmission method may be expanded to other communication systems.

In the foregoing embodiments of this application, the WLAN may adopt a Wifi interface, or other interfaces such as Bluetooth.

It should be noted that, in the service data transmission method provided in the embodiments of this application, an execution subject may be a service data transmission apparatus, or a control module in the service data transmission apparatus that is configured to perform the service data transmission method. In the embodiments of this application, an apparatus of the service data transmission method provided in the embodiments of this application is described by using an example in which a service data transmission apparatus performs the service data transmission method.

Figure 11:
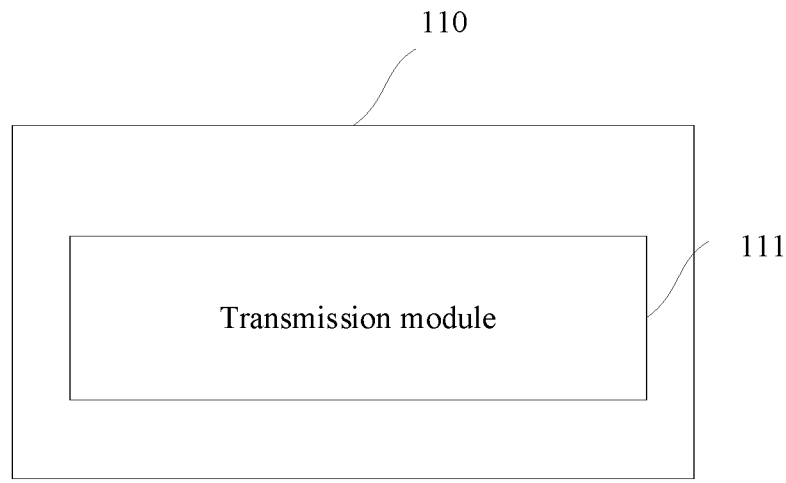
FIG. 11 is a schematic structural diagram of a service data transmission apparatus according to an embodiment of this application.

Referring to FIG. 11, an embodiment of this application provides a service data transmission apparatus 110, including:
a transmission module 111, configured to perform sending and/or receiving of service data according to SL and wireless local area network WLAN interworking configuration information.

Optionally, the SL and WLAN interworking configuration information includes at least one of SL and WLAN interworking configuration information configured by a base station or SL and WLAN interworking configuration information configured by a relay terminal.

Optionally, the SL and WLAN interworking configuration information configured by the base station includes at least one of the following:
supporting SL and WLAN interworking;
a service feature for performing WLAN transmission;
service quality of service (QoS) stream information for performing the WLAN transmission;
service data radio bearer (DRB) information for performing the WLAN transmission;
configuration of a protocol stack layer corresponding to a service for performing the WLAN transmission;
a service feature for performing WLAN split transmission or duplication transmission;
service QoS stream information for performing the WLAN split transmission or duplication transmission;
service DRB information for performing the WLAN split transmission or duplication transmission;
configuration of a protocol stack layer corresponding to a service for performing the WLAN split transmission or duplication transmission;
a service feature for performing SL transmission;
service QoS stream information for performing the SL transmission;
service DRB information for performing the SL transmission;
configuration of a protocol stack layer corresponding to a service for performing the SL transmission; or
interface or port information of WLAN transmission data.

Optionally, the SL and WLAN interworking configuration information configured by the relay terminal includes at least one of the following:
configuration information of a WLAN DRB;
configuration information of a QoS stream mapped to the WLAN DRB;
configuration information of a WLAN split DRB or duplication DRB;
configuration information of a QoS stream mapped to a WLAN split DRB;

configuration information of a WLAN interface or port;
configuration information of an SL DRB;
configuration information of a QoS stream mapped to the SL DRB; or
WLAN MAC address information involved in SL and WLAN interworking.

Optionally, the service data transmission apparatus is the relay terminal, and the service data transmission apparatus further includes at least one of the following:
a first sending module, configured to send the SL and WLAN interworking configuration information to a remote terminal; and
a first receiving module, configured to receive the SL and WLAN interworking configuration information sent by the base station and forward the information to the remote terminal.

Optionally, the service data transmission apparatus is the remote terminal, and the service data transmission apparatus further includes:
a second receiving module, configured to receive the SL and WLAN interworking configuration information sent by the base station and/or the relay terminal.

Optionally, the service data transmission apparatus is the base station, and the service data transmission apparatus further includes:
a second sending module, configured to send the SL and WLAN interworking configuration information to the relay terminal and/or the remote terminal.

Optionally, the transmission module performs one of the following:
completing the sending and/or receiving of service data completely through an SL bearer;
completing the sending and/or receiving of service data through an SL and WLAN split bearer; and
completing the sending and/or receiving of service data completely through a WLAN bearer.

Optionally, the service data transmission apparatus is a terminal, and the terminal includes a first protocol stack, where the first protocol stack is used for bearing a PC5 interface and a WLAN interface between the relay terminal and the remote terminal, and the first protocol stack includes a first PDCP entity, a first RLC entity logically connected to the first PDCP entity, an MAC entity logically connected to the first RLC entity, a PHY entity logically connected to the MAC entity, an adaptive entity logically connected to the first PDCP entity, a WLAN entity logically connected to the adaptive entity, and a PHY entity logically connected to the WLAN entity.

Optionally, the transmission module is configured to perform the sending and/or receiving of service data through the first protocol stack.

Optionally, the service data transmission apparatus is the base station, including a second protocol stack, where the second protocol stack includes a first PDCP entity, a first RLC entity logically connected to the first PDCP entity, an MAC entity logically connected to the first RLC entity, a PHY entity logically connected to the MAC entity, a second RLC entity logically connected to the first PDCP entity, an MAC entity logically connected to the second RLC entity, and a PHY entity logically connected to the MAC entity.

Optionally, the transmission module is configured to perform the sending and/or receiving of service data with the remote terminal through the second protocol stack.

Optionally, the service data transmission apparatus is the relay terminal, including a third protocol stack, where the third protocol stack is used for bearing the PC5 interface and the WLAN interface between the relay terminal and the remote terminal, and the third protocol stack includes a first PDCP entity, a first RLC entity logically connected to the first PDCP entity, an MAC entity logically connected to the first RLC entity, a PHY entity logically connected to the MAC entity, and an adaptive entity logically connected to the first PDCP entity, where the adaptive entity is logically connected to a WLAN entity of a WLAN node.

Optionally, the transmission module is configured to perform the sending and/or receiving of service data with the remote terminal through the second protocol stack.

In the embodiments of this application, according to the SL and WLAN interworking configuration information, a relay terminal and a remote terminal in a sidelink can better use an unlicensed spectrum WLAN to perform a transmission operation of interworking with the SL, thereby improving a service rate of a user, ensuring QoS of a UE service, and ensuring system efficiency and utilization of a network spectrum while improving user experience.

The service data transmission apparatus in this embodiment of this application may be an apparatus, or may be a component, an integrated circuit, or a chip in a terminal. The apparatus may be a mobile terminal or may be a non-mobile terminal. For example, the mobile terminal may include, but not limited to, the foregoing enumerated types of the terminal 11, and the non-mobile terminal may be a server, a network attached storage (Network Attached Storage, NAS), a personal computer (personal computer, PC), a television (television, TV), a teller machine, a self-service machine, or the like. This is not specifically limited in this embodiment of this application.

The service data transmission apparatus in this embodiment of this application may be an apparatus with an operating system. The operating system may be an Android (Android) operating system, may be an iOS operating system, or may be another possible operating system, and is not specifically limited in the embodiments of this application.

Figure 12:
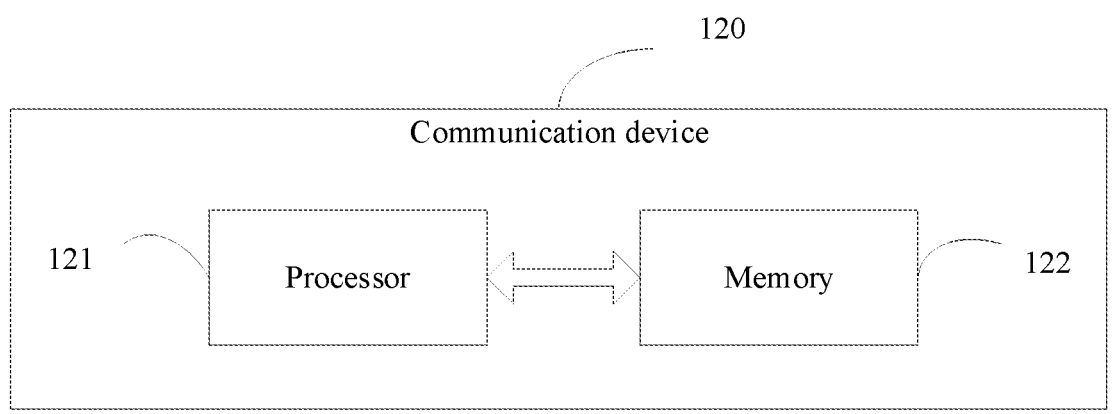
FIG. 12 is a schematic structural diagram of a communication device according to an embodiment of this application.

As shown in FIG. 12, an embodiment of this application further provides a communication device 120, including a processor 121, a memory 122, and a program or an instruction stored in the memory 122 and capable of being run on the processor 121. In this embodiment of this application, the communication device 120 may be a terminal, and the program or the instruction, when executed by the processor 121, implements the processes of the embodiments of the service data transmission method applied to the terminal, and can achieve the same technical effects. To avoid repetition, details are not described herein again. In this embodiment of this application, the communication device 120 may be a base station. The program or the instruction, when executed by the processor 121, implements the processes of the foregoing embodiments of the service data transmission method applied to the base station, and the same technical effects can be achieved. To avoid repetition, details are not described herein again.

Figure 13:
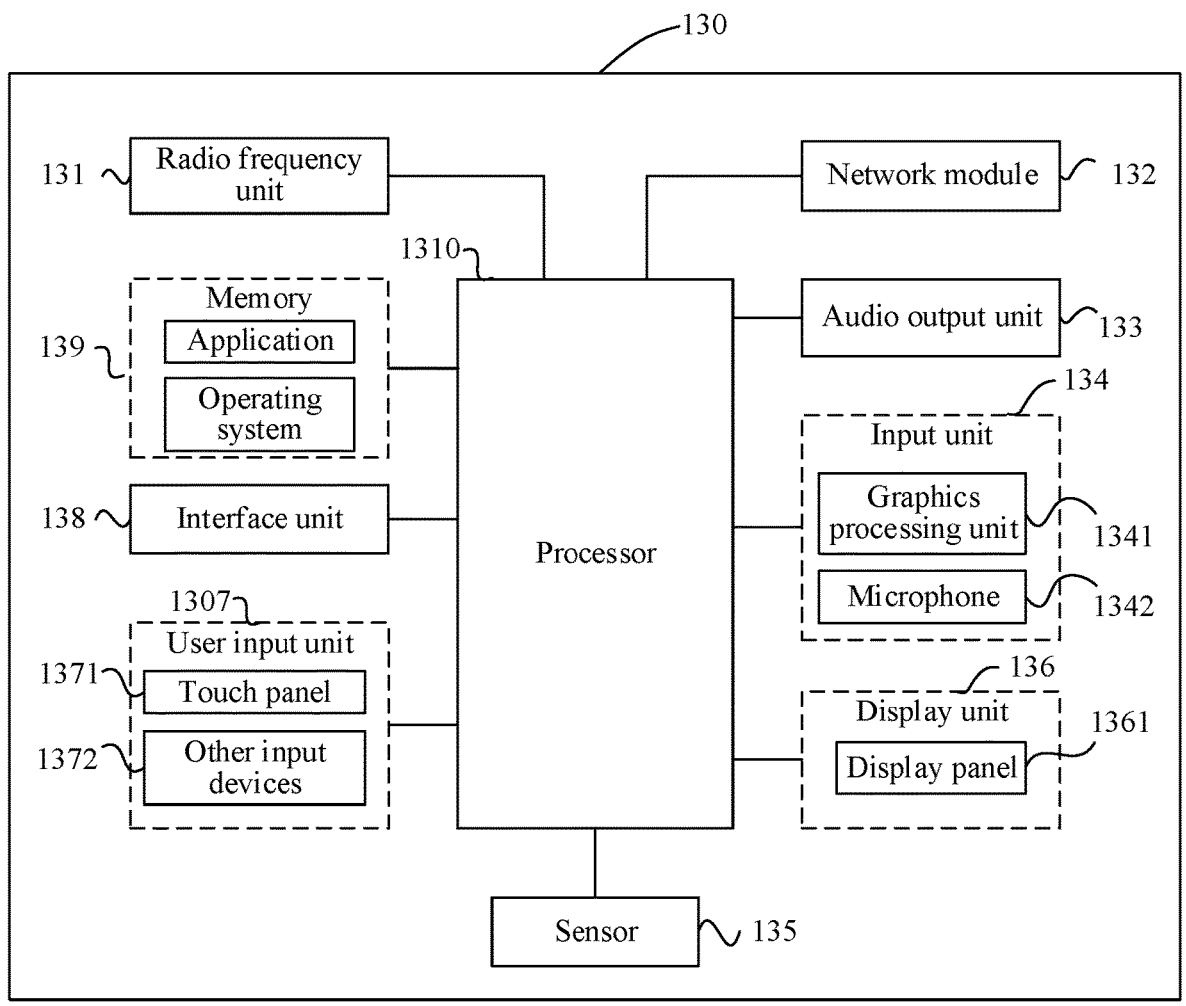
FIG. 13 is a schematic diagram of a hardware structure of a terminal for implementing the embodiments of this application.

FIG. 13 is a schematic diagram of a hardware structure of a terminal for implementing an embodiment of this application. The terminal 130 includes but is not limited to: components such as a radio frequency unit 131, a network module 132, an audio output unit 133, an input unit 134, a sensor 135, a display unit 136, a user input unit 137, an interface unit 138, a memory 139, and a processor 1310.

A person skilled in the art may understand that, the terminal 130 may further include a power supply (such as a battery) for supplying power to the components. The power supply may be logically connected to the processor 1310 by using a power management system, thereby implementing functions such as charging, discharging, and power consumption management by using the power supply management system. The terminal structure shown in FIG. 13 constitutes no limitation on the terminal, and the terminal may include more or fewer components than those shown in the figure, or some components may be combined, or a different component deployment may be used. Details are not described herein again.

It should be understood that, in this embodiment of this application, the input unit 134 may include a graphics processing unit (GPU) 1341 and a microphone 1342. The graphics processing unit 1341 performs processing on image data of a static picture or a video that is obtained by an image acquisition device (for example, a camera) in a video acquisition mode or an image acquisition mode. The display unit 136 may include a display panel 1361, the display panel 1361 may be configured in a form such as a liquid crystal display or an organic light-emitting diode. The user input unit 137 includes a touch panel 1371 and another input device 1372. The touch panel 1371 is also referred to as a touch screen. The touch panel 1371 may include two parts: a touch detection apparatus and a touch controller. The another input device 1372 may include, but not limited to, a physical keyboard, a functional key (such as a volume control key or a switch key), a track ball, a mouse, and a joystick. Details are not described herein again.

In this embodiment of this application, the radio frequency unit 131 receives downlink data from a network side device, and sends the downlink data to the processor 1310 to be processed. In addition, the radio frequency unit 701 sends uplink data to the network side device. The radio frequency unit 131 usually includes but is not limited to an antenna, at least one amplifier, a transceiver, a coupler, a low noise amplifier, a duplexer, and the like.

The memory 139 may be configured to store a software program or an instruction and various data. The memory 139 may mainly include a program storage or instruction area and a data storage area. The program storage or instruction area may store an operating system, an application or an instruction required by at least one function (for example, a sound playing function and an image playing function), or the like. In addition, the memory 139 may include a cache random access memory, and may further include a non-volatile memory. The non-volatile memory may be a read-only memory (ROM), a programmable ROM (PROM), an erasable PROM (EPROM), an electrically EPROM (EE-PROM), or a flash memory, for example, at least one magnetic disk storage device, a flash storage device, or other non-volatile solid-state storage devices.

The processor 1310 may include one or more processing units. Optionally, the processor 1310 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 1310.

The processor 1310 is configured to perform sending and/or receiving of service data according to SL and wireless local area network WLAN interworking configuration information.

In the embodiments of this application, according to the SL and WLAN interworking configuration information, a relay terminal and a remote terminal in a sidelink can better use an unlicensed spectrum WLAN to perform a transmission operation of interworking with the SL, thereby improving a service rate of a user, ensuring QoS of a UE service, and ensuring system efficiency and utilization of a network spectrum while improving user experience.

Optionally, the SL and WLAN interworking configuration information includes at least one of SL and WLAN interworking configuration information configured by a base station or SL and WLAN interworking configuration information configured by a relay terminal.

Optionally, the SL and WLAN interworking configuration information configured by the base station includes at least one of the following:
  supporting SL and WLAN interworking;
  a service feature for performing WLAN transmission;
  service quality of service (QoS) stream information for performing the WLAN transmission;
  service data radio bearer (DRB) information for performing the WLAN transmission;
  configuration of a protocol stack layer corresponding to a service for performing the WLAN transmission;
  a service feature for performing WLAN split transmission or duplication transmission;
  service QoS stream information for performing the WLAN split transmission or duplication transmission;
  service DRB information for performing the WLAN split transmission or duplication transmission;
  configuration of a protocol stack layer corresponding to a service for performing the WLAN split transmission or duplication transmission;
  a service feature for performing SL transmission;
  service QoS stream information for performing the SL transmission;
  service DRB information for performing the SL transmission;
  configuration of a protocol stack layer corresponding to a service for performing the SL transmission; or
  interface or port information of WLAN transmission data.
Optionally, the SL and WLAN interworking configuration information configured by the relay terminal includes at least one of the following:
  configuration information of a WLAN DRB;
  configuration information of a QoS stream mapped to the WLAN DRB;
  configuration information of a WLAN split DRB or duplication DRB;
  configuration information of a QoS stream mapped to a WLAN split DRB;
  configuration information of a WLAN interface or port;
  configuration information of an SL DRB;
  configuration information of a QoS stream mapped to the SL DRB; or
  WLAN MAC address information involved in SL and WLAN interworking.

Optionally, the terminal is the relay terminal, and the radio frequency unit 131 is configured to send the SL and WLAN interworking configuration information to the remote terminal; or receive the SL and WLAN interworking configuration information sent by the base station and forward the information to the remote terminal.

Optionally, the terminal is the remote terminal, and the radio frequency unit 131 is configured to receive the SL and WLAN interworking configuration information sent by the base station and/or the relay terminal.

Optionally, the processor 1310 is configured to perform one of the following:
  completing the sending and/or receiving of service data completely through an SL bearer;
  completing the sending and/or receiving of service data through an SL and WLAN split bearer; and completing the sending and/or receiving of service data completely through a WLAN bearer.

Optionally, the terminal includes a first protocol stack, where the first protocol stack is used for bearing a PC5 interface and a WLAN interface between the relay terminal and the remote terminal, and the first protocol stack includes a first PDCP entity, a first RLC entity logically connected to the first PDCP entity, an MAC entity logically connected to the first RLC entity, a PHY entity logically connected to the MAC entity, an adaptive entity logically connected to the first PDCP entity, a WLAN entity logically connected to the adaptive entity, and a PHY entity logically connected to the WLAN entity.

Optionally, the processor 1310 is configured to perform the sending and/or receiving of service data through the first protocol stack.

Optionally, the terminal is the relay terminal, including a third protocol stack, where the third protocol stack is used for bearing the PC5 interface and the WLAN interface between the relay terminal and the remote terminal, and the third protocol stack includes a first PDCP entity, a first RLC entity logically connected to the first PDCP entity, an MAC entity logically connected to the first RLC entity, a PHY entity logically connected to the MAC entity, and an adaptive entity logically connected to the first PDCP entity, where the adaptive entity is logically connected to a WLAN entity of a WLAN node.

Optionally, the processor 1310 is configured to perform the sending and/or receiving of service data with the remote terminal through the second protocol stack.

Figure 14:
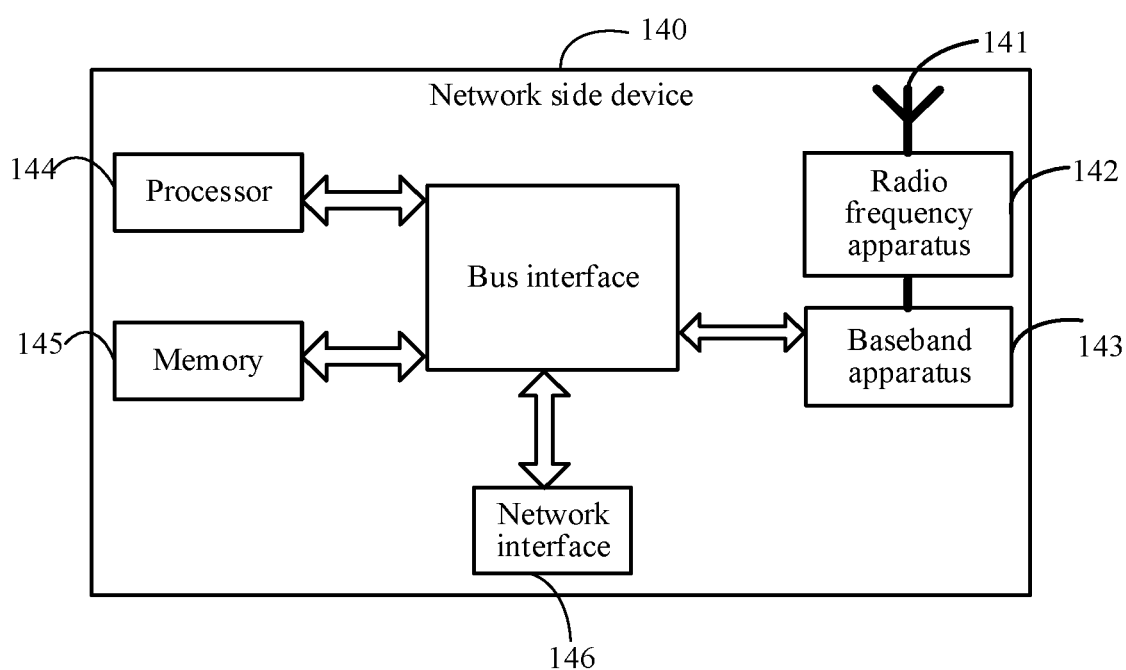
FIG. 14 is a schematic diagram of a hardware structure of a base station for implementing the embodiments of this application.

An embodiment of this application further provides a base station. As shown in FIG. 14, the base station 140 comprises: an antenna 141, a radio frequency apparatus 142, and a baseband apparatus 143. The antenna 141 is connected to the radio frequency apparatus 142. In an uplink direction, the radio frequency apparatus 142 receives information by using the antenna 141, and sends the information to the baseband apparatus 143 for processing. In a downlink direction, the baseband apparatus 143 processes information to be sent, and sends the information to the radio frequency apparatus 142. The radio frequency apparatus 142 processes the received information and sends the information by using the antenna 141.

The frequency band processing apparatus may be located in the baseband apparatus 143. The method performed by the network side device in the foregoing embodiments may be implemented in the baseband apparatus 143. The baseband apparatus 143 includes a processor 144 and a memory 145.

The baseband apparatus 143 may include, for example, at least one baseband plate. A plurality of chips are disposed on the baseband plate. As shown in FIG. 14, one of the plurality of chips is, for example, the processor 144, and is connected to the memory 145, to invoke a program in the memory 145 to perform network device operations in the foregoing method embodiments.

The baseband apparatus 143 may further include a network interface 146, configured to exchange information with the radio frequency apparatus 142. The interface is, for example, a common public radio interface (CPRI).

Specifically, the network side device in this embodiment of the present invention further includes: an instruction or a program stored in the memory 145 and capable of being run on the processor 144, where the processor 144 invokes the instruction or the program in the memory 145 to perform the method performed by modules in a case that the service data transmission apparatus is a base station as shown in FIG. 11, and the same technical effects can be achieved. To avoid repetition, details are not described herein again.

An embodiment of this application further provides a readable storage medium, where the readable storage medium stores a program or an instruction, and the program or the instruction, when executed by a processor, implements the processes of the embodiments of the service data transmission method, and can achieve the same technical effects. To avoid repetition, details are not described herein again.

The processor is the processor in the terminal of the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled with the processor, and the processor is configured to run a program or an instruction of a network side device, to implement the processes of the embodiments of the service data transmission method, and can achieve the same technical effects. To avoid repetition, details are not described herein again.

It should be understood that, the chip mentioned in this embodiment of this application may also be referred to as a system-level chip, a system chip, a chip system, a system-on-chip, or the like.

An embodiment of this application further provides a program product, where the program product is stored in a non-volatile storage medium, and the program product is executed by at least one processor to implement the processes of the embodiments of the foregoing service data transmission method, and can achieve the same technical effects. To avoid repetition, details are not described herein again.

It should be noted that, in this specification, terms "comprise", "include", and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, or combined. In addition, features described by referring to some examples may be combined in other examples.

Through the foregoing description in the foregoing implementations, a person skilled in the art can clearly learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A service data transmission method, applied to a terminal, comprising:
    performing sending and/or receiving of service data according to sidelink (SL) and wireless local area network (WLAN) interworking configuration information,
    wherein the performing sending and/or receiving of service data according to SL and WLAN interworking configuration information comprises one of the following:
    completing the sending and/or receiving of service data completely through an SL bearer;
    completing the sending and/or receiving of service data through an SL and WLAN split bearer; and
    completing the sending and/or receiving of service data completely through a WLAN bearer,
    wherein the terminal comprises a first protocol stack, wherein the first protocol stack is used for bearing a PC5 interface and a WLAN interface between a relay terminal and a remote terminal, and the first protocol stack comprises a first packet data convergence protocol (PDCP) entity, a first radio link control (RLC entity) logically connected to the first PDCP entity, an MAC entity logically connected to the first RLC entity, a physical layer (PHY) entity logically connected to the media access control (MAC) entity, an adaptive entity logically connected to the first PDCP entity, a WLAN entity logically connected to the adaptive entity, and a PHY entity logically connected to the WLAN entity.

2. The method according to claim 1, wherein the SL and WLAN interworking configuration information comprises at least one of SL and WLAN interworking configuration information configured by a base station or SL and WLAN interworking configuration information configured by a relay terminal.

3. The method according to claim 2, wherein the SL and WLAN interworking configuration information configured by the base station comprises at least one of the following:
    supporting SL and WLAN interworking;
    a service feature for performing WLAN transmission;
    service quality of service (QOS) stream information for performing the WLAN transmission;
    service data radio bearer (DRB) information for performing the WLAN transmission;
    configuration of a protocol stack layer corresponding to a service for performing the WLAN transmission;
    a service feature for performing WLAN split transmission or duplication transmission;
    service QoS stream information for performing the WLAN split transmission or duplication transmission;
    service DRB information for performing the WLAN split transmission or duplication transmission;
    configuration of a protocol stack layer corresponding to a service for performing the WLAN split transmission or duplication transmission;
    a service feature for performing SL transmission;
    service QoS stream information for performing the SL transmission;
    service DRB information for performing the SL transmission;
    configuration of a protocol stack layer corresponding to a service for performing the SL transmission; or
    interface or port information of WLAN transmission data.

4. The method according to claim 2, wherein the SL and WLAN interworking configuration information configured by the relay terminal comprises at least one of the following:
    configuration information of a WLAN DRB;
    configuration information of a QoS stream mapped to the WLAN DRB;
    configuration information of a WLAN split DRB or duplication DRB;
    configuration information of a QoS stream mapped to a WLAN split DRB;
    configuration information of a WLAN interface or port;
    configuration information of an SL DRB;
    configuration information of a QoS stream mapped to the SL DRB; or
    WLAN MAC address information involved in SL and WLAN interworking.

5. The method according to claim 1, wherein the terminal is the relay terminal, and before the performing sending and/or receiving of service data according to SL and WLAN interworking configuration information, the method further comprises at least one of the following:
    sending the SL and WLAN interworking configuration information to a remote terminal; and
    receiving the SL and WLAN interworking configuration information sent by the base station and forwarding the information to the remote terminal.

6. The method according to claim 1, wherein the terminal is a remote terminal, and before the performing sending and/or receiving of service data according to SL and WLAN interworking configuration information, the method further comprises:
    receiving the SL and WLAN interworking configuration information sent by the base station and/or the relay terminal.

7. The method according to claim 1, wherein the completing the sending and/or receiving of service data through an SL and WLAN split bearer comprises:
    sending and/or receiving service data through the first protocol stack.

8. A service data transmission apparatus, comprising: a processor, a memory, and a program or an instruction stored in the memory and capable of being run on the processor, wherein the program or the instruction, when executed by the processor, causes the processor to perform the method according to claim 1.

9. The apparatus according to claim 8, wherein the SL and WLAN interworking configuration information comprises at least one of SL and WLAN interworking configuration information configured by a base station or SL and WLAN interworking configuration information configured by a relay terminal.

10. A service data transmission method, applied to a base station, comprising:

performing sending and/or receiving of service data according to sidelink (SL) and wireless local area network (WLAN) interworking configuration information-, wherein the performing sending and/or receiving of service data according to SL and WLAN interworking configuration information comprises one of the following:

completing the sending and/or receiving of service data completely through an SL bearer;

completing the sending and/or receiving of service data through an SL and WLAN split bearer; and completing the sending and/or receiving of service data completely through a WLAN bearer, wherein the base station comprises a second protocol stack, wherein the second protocol stack comprises a first PDCP entity, a first RLC entity logically connected to the first PDCP entity, an MAC entity logically connected to the first RLC entity, a PHY entity logically connected to the MAC entity, a second RLC entity logically connected to the first PDCP entity, an MAC entity logically connected to the second RLC entity, and a PHY entity logically connected to the MAC entity.

11. The method according to claim 10, wherein the SL and WLAN interworking configuration information comprises at least one of the following:

supporting SL and WLAN interworking;

a service feature for performing WLAN transmission;

service quality of service (QOS) stream information for performing the WLAN transmission;

service data radio bearer (DRB) information for performing the WLAN transmission;

configuration of a protocol stack layer corresponding to a service for performing the WLAN transmission;

a service feature for performing WLAN split transmission or duplication transmission;

service QoS stream information for performing the WLAN split transmission or duplication transmission;

service DRB information for performing the WLAN split transmission or duplication transmission;

configuration of a protocol stack layer corresponding to a service for performing the WLAN split transmission or duplication transmission;

a service feature for performing SL transmission;

service QoS stream information for performing the SL transmission;

service DRB information for performing the SL transmission;

configuration of a protocol stack layer corresponding to a service for performing the SL transmission; and interface or port information of WLAN transmission data.

12. The method according to claim 10, wherein before the performing sending and/or receiving of service data according to SL and WLAN interworking configuration information, the method further comprises:

sending the SL and WLAN interworking configuration information to a relay terminal and/or a remote terminal.

13. The method according to claim 10, wherein the completing the sending and/or receiving of service data through an SL and WLAN split bearer comprises:

performing the sending and/or receiving of service data with a remote terminal through the second protocol stack.

14. A service data transmission method, applied to a terminal, comprising:

performing sending and/or receiving of service data according to sidelink (SL) and wireless local area network (WLAN) interworking configuration information, wherein the performing sending and/or receiving of service data according to SL and WLAN interworking configuration information comprises one of the following:

completing the sending and/or receiving of service data completely through an SL bearer;

completing the sending and/or receiving of service data through an SL and WLAN split bearer; and completing the sending and/or receiving of service data completely through a WLAN bearer, wherein the terminal is a relay terminal, comprising a third protocol stack, wherein the third protocol stack is used for bearing a PC5 interface and a WLAN interface between the relay terminal and a remote terminal, and the third protocol stack comprises a first PDCP entity, a first RLC entity logically connected to the first PDCP entity, an MAC entity logically connected to the first RLC entity, a PHY entity logically connected to the MAC entity, and an adaptive entity logically connected to the first PDCP entity, wherein the adaptive entity is logically connected to a WLAN entity of a WLAN node.

15. The method according to claim 14, wherein the SL and WLAN interworking configuration information comprises at least one of SL and WLAN interworking configuration information configured by a base station or SL and WLAN interworking configuration information configured by the relay terminal.

16. The method according to claim 14, wherein the completing the sending and/or receiving of service data through an SL and WLAN split bearer comprises:

performing the sending and/or receiving of service data with the remote terminal through the third protocol stack.

17. A service data transmission apparatus, comprising: a processor, a memory, and a program or an instruction stored in the memory and capable of being run on the processor, wherein the program or the instruction, when executed by the processor, causes the processor to perform the method according to claim 10.

18. The apparatus according to claim 17, wherein the SL and WLAN interworking configuration information comprises at least one of SL and WLAN interworking configuration information configured by a base station or SL and WLAN interworking configuration information configured by a relay terminal.

19. A service data transmission apparatus, comprising: a processor, a memory, and a program or an instruction stored in the memory and capable of being run on the processor, wherein the program or the instruction, when executed by the processor, causes the processor to perform the method according to claim 14.

20. The apparatus according to claim 19, wherein the SL and WLAN interworking configuration information comprises at least one of SL and WLAN interworking configuration information configured by a base station or SL and WLAN interworking configuration information configured by a relay terminal.

* * * * *